United States Patent [19]
Terajima et al.

[11] Patent Number: 6,052,174
[45] Date of Patent: Apr. 18, 2000

[54] CONDITION-SETTING METHOD FOR PHOTOGRAPHIC PRINTER

[75] Inventors: Akirou Terajima; Kazuhiko Katakura, both of Kanagawa, Japan

[73] Assignee: Fuji Photo Film Co., Ltd., Kanagawa, Japan

[21] Appl. No.: 08/682,357

[22] Filed: Jul. 17, 1996

[30] Foreign Application Priority Data

| Jul. 17, 1995 | [JP] | Japan | 7-180083 |
| Jun. 4, 1996 | [JP] | Japan | 8-141717 |

[51] Int. Cl.[7] ............ G03B 27/54; G03B 27/32; G03B 27/52
[52] U.S. Cl. .................. 355/67; 355/27; 355/40
[58] Field of Search ............ 355/32, 27, 35, 355/37, 38, 40, 41, 67, 77; 358/487, 506

[56] References Cited

U.S. PATENT DOCUMENTS

| 4,990,950 | 2/1991 | Tokuda | 355/77 |
| 5,019,858 | 5/1991 | Suzuki | 355/35 |
| 5,357,315 | 10/1994 | Suzuki | 355/77 |
| 5,604,566 | 2/1997 | Mano et al. | 355/70 |
| 5,684,568 | 11/1997 | Ishikawa et al. | 355/35 |
| 5,719,540 | 2/1998 | Takaoka et al. | 355/77 |
| 5,719,661 | 2/1998 | Terashita | 355/38 |
| 5,729,327 | 3/1998 | Narita | 355/40 |
| 5,745,220 | 4/1998 | Okazaki et al. | 355/54 |

*Primary Examiner*—Safet Metjahic
*Assistant Examiner*—Hung Henry Nguyen
*Attorney, Agent, or Firm*—Sughrue, Mion, Zinn, Macpeak & Seas, PLLC

[57] ABSTRACT

A condition-setting method for a photographic printer is disclosed, which is capable of performing the condition-setting work both simply and rapidly. In setting conditions for a digital exposure section, a single condition-setting image data having added thereto a correction value for the condition-setting process that has been performed at a surface exposure section is produced by an image signal processing section and stored in an image memory. A subsidiary control section sets an exposure time for the digital exposure section on the basis of the condition-setting image data stored in the image memory. The conditions need not be set for the digital exposure section using a plurality of Bull's eye negative films having different negative film densities, thereby simplifying the condition-setting job.

20 Claims, 5 Drawing Sheets

CONDITION-SETTING METHOD FOR PHOTOGRAPHIC PRINTER

BACKGROUND OF THE INVENTION

1. Field of the Invention

The present invention relates to a method of setting conditions for a photographic printer, or more in particular to a condition-setting method for a photographic printer comprising a surface exposure section for print-exposing an image recorded on a developed photographic film to a light-sensitive material and a digital exposure section for print-exposing an image displayed on a two-dimensional display unit to the light-sensitive material.

2. Description of the Prior Art

A photographic printing apparatus (photographic printer) equipped with a paper processor for producing a print by developing the print-exposed paper is well known, in which each frame of an image recorded on a developed negative film is print-exposed on paper. In the photographic printer of this type, a proper print cannot continue to be maintained due to secular variations of the exposure light source or developer or the contamination of the light source. It is therefore necessary to renew the setting of the exposure conditions from time to time. Conventionally, in the case where the exposure conditions are set for the eletrophotographic printer, what is called a "Bull's eye" negative film corresponding to a negative film on which a circular gray object is photographed is used and print-exposed, and the density of the resulting test print is compared with a reference density to correct the exposure conditions. In the process, Bull's eye negative films of four different densities are used in order to produce a proper print regardless of the density of a particular negative film.

In recent years, a photographic printer has been proposed, which comprises a digital exposure section for print-exposing an image displayed on a two-dimensional display unit on paper in addition to a surface exposure section for print-exposing each frame of an image recorded on a negative film on the same paper. An example application of the digital exposure section is what is called an index printer in which several frames of image recorded in a unit of negative film are arranged in matrix and printed in compressed form. With the index printer, the images recorded in the negative film are read by a scanner, the data on the image thus read are displayed in an alignment of each several frames on a two-dimensional display unit. The displayed images are exposed for printing on paper at a predetermined timing, thereby producing an index in matrix.

Conditions for this digital exposure section are also required to be set in order to maintain a satisfactory quality of the final print. Despite of this requirement, a proper method of setting such conditions for the digital exposure section has yet to be established. A conceivable condition-setting method for the digital exposure section is, as for the surface exposure section, by using Bull's eye negative films of four different densities. This is a very complicated and time-consuming job, however, as it requires repetition of exactly the same process as the condition-setting for the surface exposure section.

SUMMARY OF THE INVENTION

The present invention has been developed in view of the above-mentioned facts, and the object of the invention is to provide a method which is capable of setting conditions for a photographic printer very easily and rapidly.

According to the invention, there is provided a condition-setting method for a photographic printer comprising a surface exposure section for print-exposing an image recorded on a developed photographic film to a light-sensitive material, and a digital exposure section for displaying digitally-processed image data on a two-dimensional display unit and print-exposing the displayed image to the light-sensitive material, the method comprising the steps of:

storing condition-setting image data having added thereto a correction value used for setting the exposure conditions for the surface exposure section; and setting reference exposure conditions for the digital exposure section on the basis of the condition-setting image data stored.

According to this invention, condition-setting image data are stored in an image memory together with a correction value added for the condition-setting process performed in the surface exposure section. The condition-setting image data stored in the image memory has added thereto a correction value for producing a proper print, for example, regardless of the negative film density. Once a reference exposure time (assuming a constant light quantity) is set for the digital exposure section on the basis of the condition-setting image data stored in the image memory, therefore, a reference exposure time can be properly set without using a plurality of condition-setting negative films of different densities. The condition-setting job can thus be simplified.

In this invention, the density of the image print-exposed at the digital exposure section is measured, and the reference exposure conditions can be set by converging the density value measurement to a reference density. According to this embodiment, a print is produced by printing for the reference exposure time set at the digital exposure section, the effect (deterioration of the print quality) of the factors (including the characteristics deterioration with time of the parts making up the digital exposure section) specific to the digital exposure section may not be eliminated. However, when the condition-setting image data stored in the image memory is displayed on a two-dimensional display unit, the condition-setting image thus displayed is printed on a light-sensitive material to produce a print and the reference exposure time is corrected in such a manner that the density of the print thus produced is converged to the target value, then the variations in the print conditions due to the factors specific to the digital exposure section can be obviated.

In this invention, the reference exposure conditions can be set by converging the print density at the surface exposure section and the print density at the digital exposure section to the same target value. According to this embodiment, identical reference exposure conditions are secured for the surface exposure section and the digital exposure section so that the densities of the prints produced in the two exposure sections are identical with each other regardless of the difference in the optical system.

BRIEF DESCRIPTION OF THE DRAWINGS

FIGS. 4A and 4B show examples of images printed on paper at the time of setting conditions for the digital exposure section, in which

DETAILED DESCRIPTION OF THE PREFERRED EMBODIMENTS

With reference to the accompanying drawings, embodiments of the present invention will be described hereinafter. In the embodiments, a liquid crystal panel is used as a two-dimensional display unit.

Figure 1:
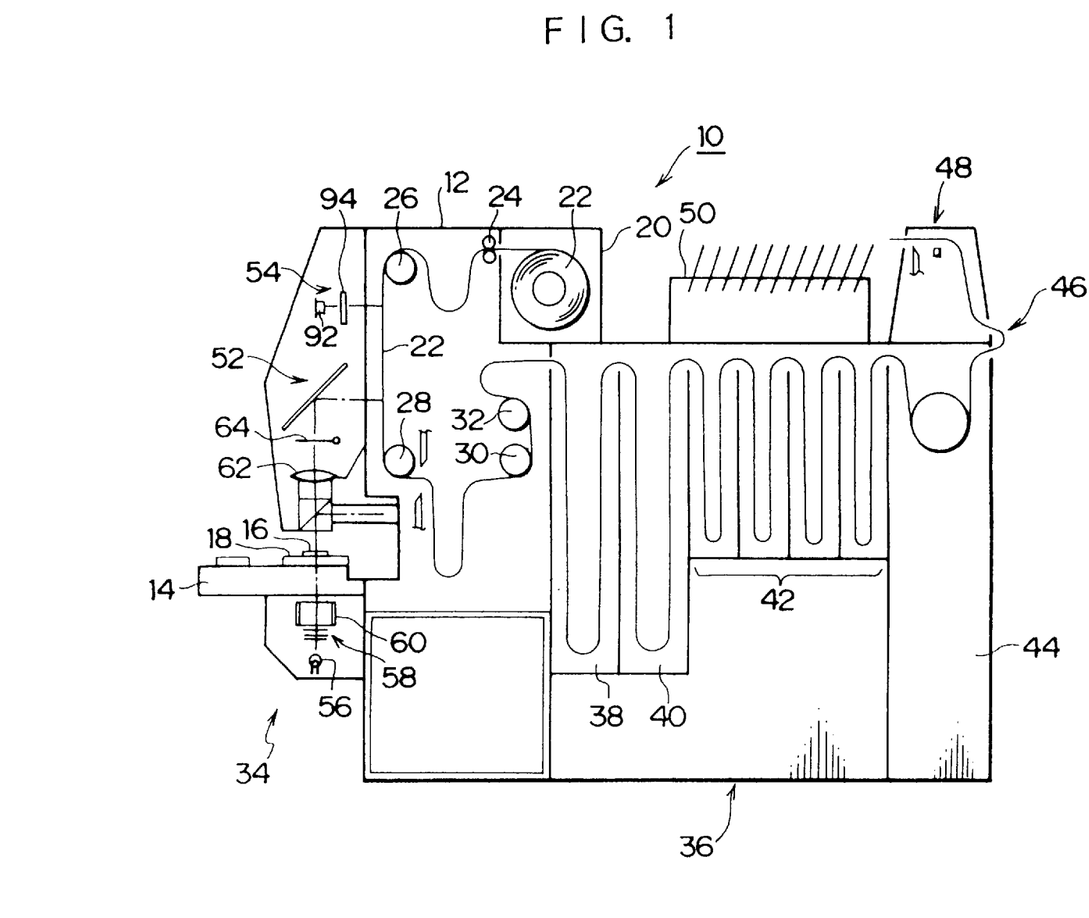
FIG. 1 is a diagram showing an internal configuration of a printer processor according to an embodiment.

The structure of a printer processor (photographic printer) 10 according to the present invention is schematically shown in FIG. 1. The printer processor 10 consists of a print section 34 for exposing and printing an image recorded on a developed negative film on a color paper, and a paper processor section 36 for performing the processes of development, fixing, washing, drying and the like on the color paper printed with the image at the print section 34. The print section 34 has a working table 14 projected from the front of a casing 12. A negative carrier 18 for setting a developed negative film 16 is installed on the working table 14. A paper magazine 20 that has taken up the color paper 22 as a light-sensitive material in layers is replaceably mounted at the upper part of the casing 12. The color paper 22 pulled out of the paper magazine 20 is inserted into the casing 12, transported toward the front of the casing 12 in substantially the horizontal direction by rollers 24, 26, and then redirected by 90° downward. While being transported downward, the color paper 22 is printed-exposed with an image at the surface exposure section 52 and the digital exposure section 54 respectively. The color paper 22 thus exposed for printing is transported to the paper processor section 36 by rollers 28, 30, 32.

The paper processor section 36 includes a coloring development subsection 38, a bleaching-fixing subsection 40, a rising subsection 42 and a drying subsection 44. The color paper 22 print-exposed by the print section 34 is first developed by the developer at the coloring development subsection 38, followed by being fixed at a fixing agent at the bleaching-fixing subsection 40. The color paper 22, after being fixed, is washed in water at the rinsing subsection 42, after which it is transferred to the drying subsection 44 where it is dried.

The color paper 22 which has been dried at the drying subsection 44 is sent to a cutter 48 through a paper density measuring unit 46. The cutter 48 cuts the color paper 22 by image frame into photographic prints, which are discharged out of the casing 12. The color paper 22 (photographic print) thus discharged out of the casing 12 are appropriately sorted by a sorter 50.

Figure 2:
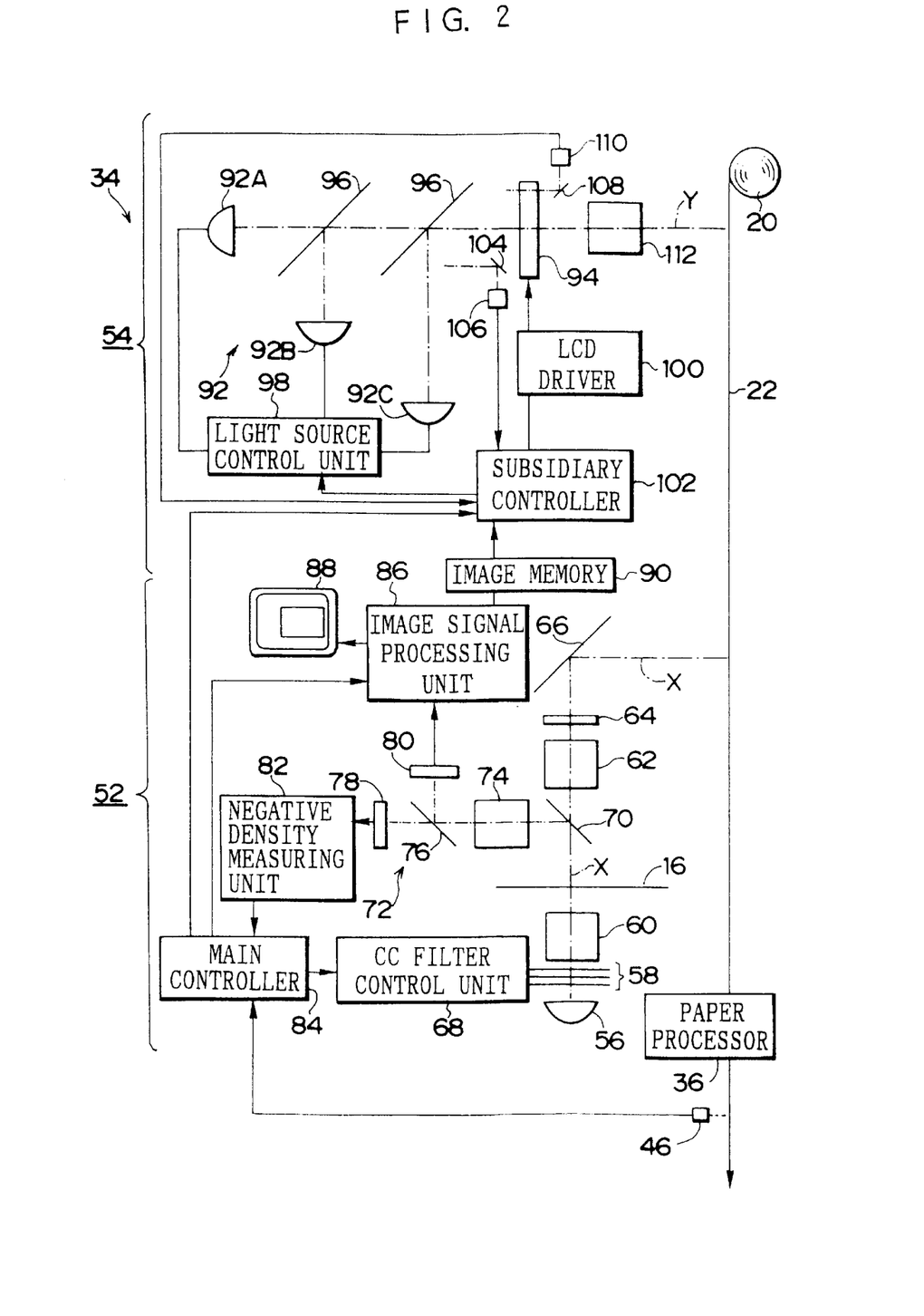
FIG. 2 is a diagram showing a general configuration of a print section of the printer processor.

The print section 34 is shown in detail in FIG. 2. The print section 34 includes a surface exposure section 52 for printing the images recorded on the negative film 16 on the color paper 22 frame by frame and printing them simultaneously, and a digital exposure section 54 for producing an index print (hereinafter referred to as the IX print) by printing the images of the negative film 16 in matrix. The IX print is for checking each frame of a volume of negative film 16 for the contents of the photographs taken in it.

The surface exposure section 52 includes an exposure light source 56 made of a halogen lamp, a color correction filter (hereinafter referred to as the CC filter set) 58 and a scattering box 60 disposed under the negative film 16 loaded in the negative carrier 18 (FIG. 1) on the one hand, and an exposure lens 62, a black shutter 64 and a reflection mirror 66 above the negative film 16 on the other hand. The light emitted from the exposure light source 56 is irradiated on the negative film 16 through the CC filter set 58 and the scattering box 60. The CC filter set 58 is composed of three filters of C (cyan), M (magenta) and Y (yellow), each of which is adapted to be inserted into and withdrawn from the light path X as required by means of a CC filter controller 68. The light transmitted through the negative film 16 reaches the reflection mirror 66 through the exposure lens 62 and the black shutter 64, deflected about 90° by the reflection mirror 66 and focused on the color paper 22. As a result, a positive image equivalent to a frame of image recorded on the negative film is printed on the color paper 22 at a predetermined magnification.

A half-mirror 70 is interposed between the negative film 16 and the exposure lens 62. Part of the light transmitted through the negative film 16 is reflected by the half-mirror 70 and enters a light-measuring system 72. The light-measuring system 72 includes a light-measuring lens 74, a half-mirror 76 and scanners 78, 80 each having a CCD color image sensor for monitoring the image recorded on the negative film 16. The image monitored by the scanner 78 enters a negative film density measuring section 82. The negative film density measuring section 82 is for measuring the LATD (Large Area Transmittance Density) for each color of R (red), G (green) and B (blue) on the basis of the image data supplied from the scanner 78. The resulting measurement is supplied to a main control section 84.

The main control section 84, which is for monitoring and controlling the whole processes of the printer processor 10, includes a CPU, a RAM and a ROM not shown. The main control section 84, in response to the LATD applied thereto from the negative film density measuring section 82, calculates the exposure amount (exposure time) for each of the colors R, G and B corresponding to the input LATD, and outputs a correction signal based on the calculated exposure amount to a CC filter controller 68. In response to the correction signal applied thereto, the CC filter controller 68 regulates the amount of movement of each filter of the CC filter set 58 on the basis of the input correction signal. The image monitored by the scanner 80, on the other hand, is input to and processed by an image signal processing section 86. The image signal processing section 86 simulates the result of image printing recorded on the negative film 16 and displays it on a simulator 88 constituting an image display unit. The image signal processing section 86 is also connected to an image memory 90 of the digital exposure section 54 so that the image on the negative film 16 read by the scanner 80 is stored in the image memory 90.

The digital exposure section 54 includes an exposure light source 92 for the IX print in addition to the image memory 90. The exposure light source 92 includes light-emitting diodes (LED) 92A to 92C for emitting light of the colors of R, G and B respectively. The operation of each of the light-emitting diodes 92A to 92C is controlled by a light source controller 98. Among the LEDs 92A to 92C, the LED (B-LED) 92A for emitting the blue light is disposed on an exposure light axis Y set above and in parallel to the exposure optical axis X of the surface exposure section 54. Dichroic mirrors 96, 96 are arranged on the side of the B-LED 92A from which light is emitted, so that the optical axes of the red light emitted from the R-LED 92B and the green light emitted from the G-LED 92C are rendered to coincide with the exposure optical axis Y.

A liquid crystal panel (LCD) 94 constituting a display unit for the index image (IX image) and an exposure lens 112 are interposed between the exposure light source 92 and the color paper 22. The light emitted from the exposure light source 92 is focused on the color paper 22 through the liquid crystal panel 94 and the exposure lens 112, whereby the IX image displayed on the liquid crystal panel 94 is printed on the color paper 22. The liquid crystal panel 94 includes a multiplicity of liquid crystal cells regularly arranged between opposed transparent electrodes in a plane perpendicular to the exposure optical axis Y. The liquid crystal panel 94 according to the present embodiment is driven by an LCD driver 100 to display IX images of white, black and immediate tone with 256 gradations of transmission density.

The exposure light source 92 and the liquid crystal panel 94 are connected to a subsidiary controller 102 through the light source controller 98 and the LCD driver 100 respectively. The subsidiary controller 102, which is for monitoring and controlling the processing at the digital exposure section 54, includes a CPU, a RAM, a ROM not shown. The subsidiary controller 102 retrieves the image data stored in the image memory 90 and forms an IX image with several (five) frames of image in alignment. The IX image thus formed is displayed on the liquid crystal panel 94 through the LCD driver 100.

A reflection mirror 104 and a source light quantity sensor 106 are disposed at a position on the exposure light source 92 side of the liquid crystal panel 94 not affecting the image displayed on the liquid crystal panel 94 so as to enable the source light quantity sensor 106 to detect the quantity of the light emitted from the exposure light source 92. In similar fashion, a reflection mirror 108 and a light quantity sensor 110 are located on the color paper 22 side of the liquid crystal panel 94 so that the transmitted light quantity of the liquid crystal panel 94 is detected by the light quantity sensor 110. The light quantities of the R, G and B colors detected by the light quantity sensors 106 and 110 are applied to the subsidiary controller 102. The subsidiary controller 102 calculates a correction amount of the source light quantity on the basis of the light quantity value applied thereto from the light quantity sensor 106 and thus controls the light-source controller 98, thereby properly regulating the light quantity emitted from the LEDs 92A to 92C. Also, a correction amount of the transmitted light quantity is calculated on the basis of the light quantity applied thereto from the light quantity sensor 110 to control the LCD driver 100. The density of the image displayed on the liquid crystal panel 94 thus is regulated properly.

Figure 5:
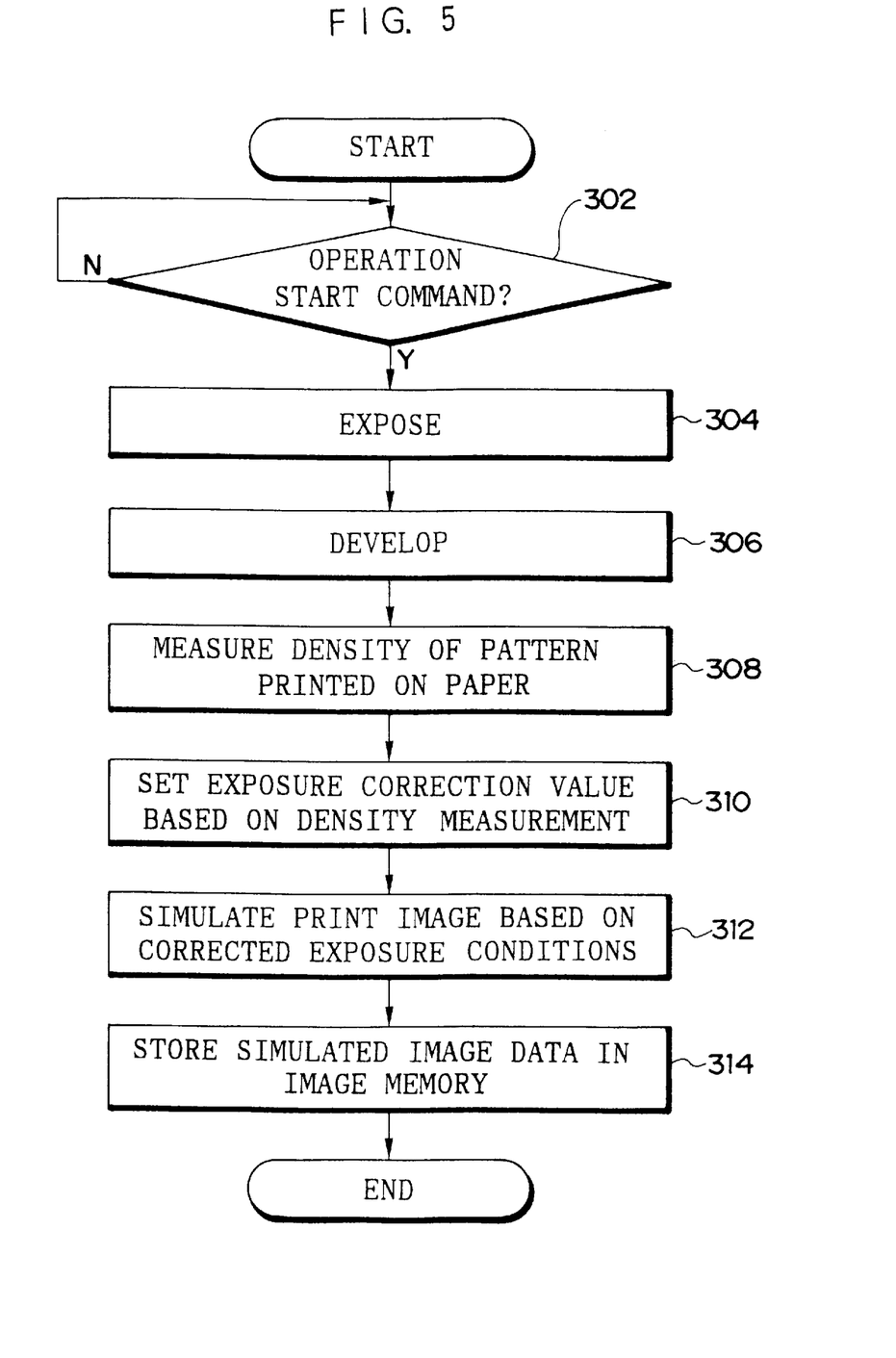
FIG. 5 is a flowchart showing a control routine for the surface exposure section used at the time of setting conditions for the printer processor.

Next, the operation of the embodiment will be explained. FIG. 5 is a diagram showing a control routine executed by the main control section 84 at the time of setting conditions for the printer processor 10.

Figure 3:
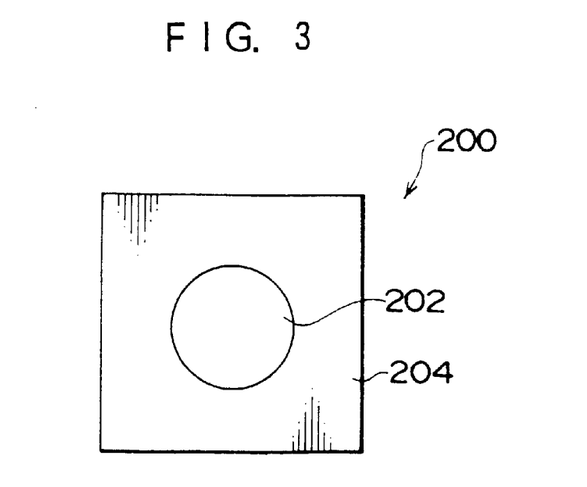
FIG. 3 is a diagram showing an example of a Bull's eye negative film used for condition-setting for the surface exposure section.

In setting conditions for the printer processor 10, the operator sets the Bull's eye negative film on the negative carrier 18 on the working table 14, and then issues a command for the condition-setting work by way of the keyboard. The Bull's eye negative film, as shown in FIG. 3, includes a portion 204 corresponding to a negative film taken of a yellow-greenish object around a portion 202 corresponding to a negative film taken of a circular gray object. In response to the command from the operator for setting the conditions, step 304 in FIG. 5 performs the printing and exposure process. Specifically, an exposure light source 56 is turned on and a shutter 64 is opened, so that the light emitted from the exposure light source 56 is irradiated on the color paper 22 through the CC filter set 58, the Bull's eye negative film, the reflection mirror 66, etc. The image on the Bull's eye negative film thus is printed on the color paper 22. The Bull's eye negative film according to this embodiment has four frames of "under", "normal", "over" and "super-over" having different densities. As the color paper 22 and the frames of the Bull's eye negative film are fed, the image of each frame of the Bull's eye negative film is printed on the color paper 22 sequentially.

Figure 4A:
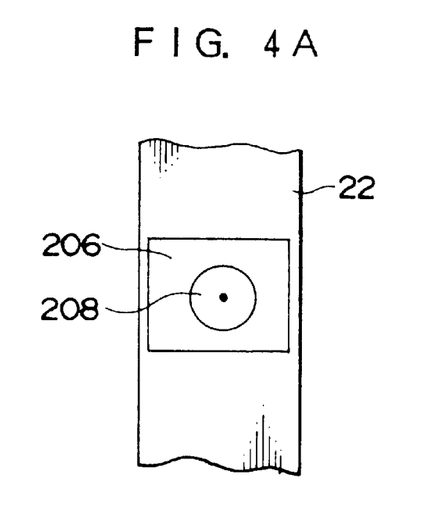
FIG. 4A shows an example of a circular image printed.

Step 306 transports the color paper 22 to the paper processor 36 and performs a series of processing including development and fixing. Next, step 308 measures the density of the image printed on the paper 22 for each of the colors R, G and B by means of the paper density measuring section 46. The density at the central portion of a circular pattern 208 corresponding to the image of each frame of the Bull's eye negative film is measured as shown in FIG. 4A. Step 310 sets an exposure correction value on the basis of the density value measured at step 308, and calculates an exposure amount (exposure time) on the basis of the exposure correction value thus set. This exposure correction value is specifically set in the manner described in (1) and (2) below. (1) The density corresponding to the "normal" frame of the Bull's eye negative film is compared with a reference density value and set in such a way that the print density converges to the reference density value. (2) The density value for the "under" frame or "over" frame is compared with the density corresponding to the "normal" frame and is set so that the density of a final print always conforms to that of the print of normal frame. The exposure correction value can be set either automatically or manually.

Step 312 simulates a print associated with one normal frame among four frames of the Bull's eye negative film. More specifically, at the time of printing by exposure of the Bull's eye negative film, the image recorded on each frame of the Bull's eye negative film is read by the scanner 80 and applied to the image signal processing section 86. The image signal processing section 86, upon application thereto of an image corresponding to the normal frame, receive s the exposure amount data calculated at the main control section 84, and simulates an image on the paper 22 corresponding to the image (normal image) recorded on the normal frame on the basis of the exposure amount data received (the density information contained in the image data supplied from the scanner 80 is corrected). Step 314 stores in the image memory 90 the image data corrected in exposure by the normal image and thus completes the processing.

Figure 6:
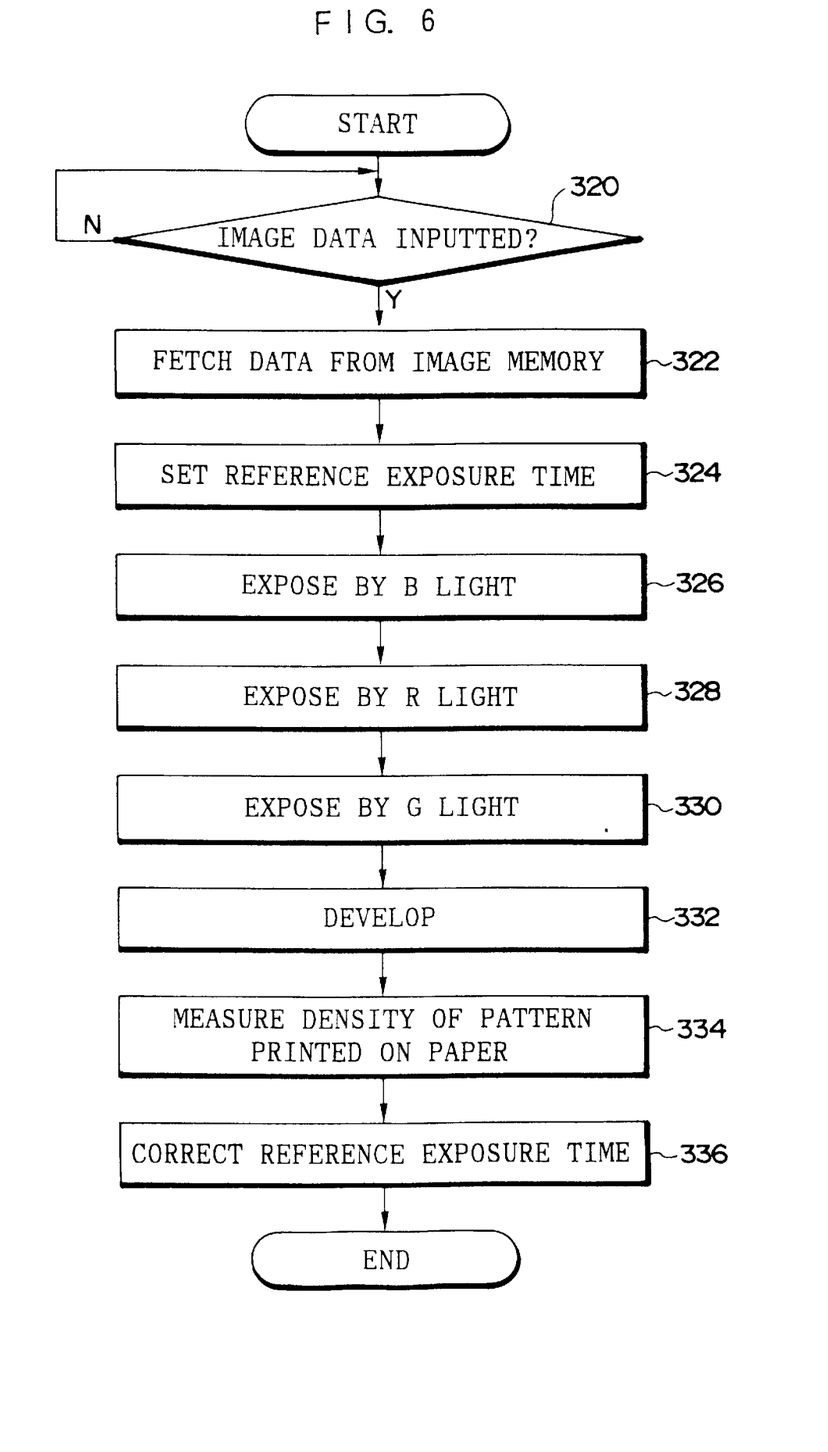
FIG. 6 is a flowchart showing a control routine for the digital exposure section used at the time of setting conditions for the printer processor.

FIG. 6 shows a control routine executed by the subsidiary controller 102 at the time of setting conditions for the printer processor 10. The image data is read from the image memory 90, and a reference exposure time for the digital exposure section 54 is set for each color of R, G and B on the basis of the image data thus read (steps 320 to 324). The time setting may be identical for each of the colors. Steps 326 to 330 perform the exposure and printing operations for each color of R, G and B with the exposure time set at step 324. The image data read from the image memory 90 has added thereto an exposure correction amount for the normal negative film used at the time of setting the conditions for the surface exposure section 52. As long as this exposure correction amount is not zero, an image different from the actual normal gray is displayed on the liquid crystal panel 94.

Step 332 transports the color paper 22 to the paper processor 36 for performing a series of processes including development and fixing. Step 334 measures the density of the printed image for each color of R, G and B by means of the paper density measuring section 46. Step 336 compares the density value measured at step 334 with a reference density value, and corrects the reference exposure time in such a manner that the two density values coincide with each other.

As described above, according to this embodiment, an image data having added thereto an exposure correction amount corresponding to the normal image obtained by setting conditions for the surface exposure section 52 is stored in the image memory 90, and the exposure time of the digital exposure section 54 is set on the basis of the image data thus stored. The conditions for the digital exposure section 54, therefore, can be set very simply and rapidly. More specifically, the image data stored in the image memory 90 contains proper correction information after removing the effect of the various factors affecting the print conditions (such a characteristics change due to paper difference) other than those attributable to the digital exposure section 54. If the exposure time of the digital exposure section 54 is determined on the basis of the correction information contained in the image data, therefore, a proper print similar to that obtained at the surface exposure section 52 is obtained, thereby eliminating the need of setting conditions using a plurality of Bull's eye negative films unlike in the prior art.

Also, according to the present embodiment, the image stored in the image memory 90 is displayed on the liquid crystal panel 94 and printed by exposure on the paper 22, the density of the image thus printed by exposure is measured by the paper density measuring section 46, and the exposure time is corrected in such a manner that the density measurement converges to a reference density. Even in the case where the characteristics of the LEDs 92*a* to 92*c* or the liquid crystal panel 94 undergo a change, therefore, a proper IX print can be produced.

In addition, the image stored in the image memory 90 is displayed on the liquid crystal panel 94 with the maximum degree of magnification possible the liquid crystal panel 94. The image printed on the paper 22, therefore, can be measured accurately by the paper density measuring section 46. The condition-setting job can thus be automated.

Also, in the case where the print density value is converged to the same target value in setting conditions for the surface exposure section 52 as in setting conditions for the digital exposure section 54, the densities of the prints produced by the two exposure sections 52, 54 can be rendered to coincide with each other regardless of any difference which may exist in the source light system or the exposure control system between the surface exposure section 52 a nd the digital exposure section 54.

In the foregoing embodiment, an index printer in which the image recorded on the negative film 16 is printed by expo sure in matrix is described as the digital exposure section 54 of the printer processor 10. The invention, however, is not confined to such a configuration but is applicable with equal effect to a configuration in which an image represented by digitally-processed image data is displayed on the two-dimensional display unit 94 and the image thus displayed is exposed and printed.

Further, apart from the above-mentioned embodiment referring to the liquid crystal panel 94 as a two-dimensional display unit, any of the devices shown in Table 1 below other than the liquid crystal panel 94 can be employed as a two-dimensional display unit applicable to the invention. Also, a similar two-dimensional display unit to any of those shown in Table 1 can be used.

TABLE 1

| | Mnemonic | Meaning |
|---|---|---|
| Light-emitting type | CRT | cathode ray tube |
| | PDP | plasma display |
| | ELD | electroluminescent display |
| | VFD | vacuum fluorescent display |
| | LED | light emitting diode |
| Photo-detecting type | LCD | liquid crystal display |
| | ECD | electrochemical display |
| | EPID | electrophoretic image display |
| | SPD | suspended particle display |
| | TBD | twisting ball display |
| | PLZT | transparent ceramics display |
| | DMD | digital micromirror device |

Figure 4B:
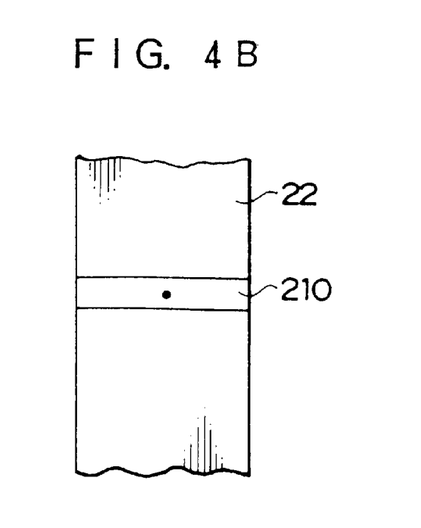
FIG. 4B shows an example of a band-shaped image printed.

Despite the above-mentioned embodiment in which an image corresponding to the image of the Bull's eye negative film is stored in the image memory 90 and displayed on the liquid crystal panel 94 at the time of setting conditions for the digital exposure section 54, the invention is not limited to such a configuration, but other image may be displayed on the liquid crystal panel 94 with equal effect. For example, a band-shaped pattern extending along the width of the liquid crystal panel 94 is displayed and a band-shaped pattern is printed as shown in FIG. 4B. As a consequence, a measurement error can be prevented which otherwise might occur due to the displacement of the density measuring point.

What is claimed is:

1. A condition-setting method for a photographic printer comprising a surface exposure section for print-exposing an image recorded on a developed photographic film to a light-sensitive material, and a digital exposure section for displaying digitally-processed image data on a two-dimensional display unit and print-exposing the displayed image to said light-sensitive material, said method comprising the steps of:

storing condition setting image data having added thereto a correction value, generated in said surface exposing section, used for setting the exposure conditions for said surface exposure section; and setting reference exposure conditions for said digital exposure section on the basis of the condition-setting image data stored.

2. A condition-setting method for a photographic printer according to claim 1, wherein the reference exposure conditions are set by converging the print density at the surface exposure section and the print density at the digital exposure section to the same target value.

3. A condition-setting method for a photographic printer according to claim 1, wherein the density of the image print-exposed at said digital exposure section is measured, and the reference exposure conditions are set by converging the density value measurement to a reference density.

4. A condition-setting method for a photographic printer according to claim 3, wherein the reference exposure conditions are set by converging the print density at said surface exposure section and the print density at said digital exposure section to the same target value.

5. A condition-setting method for a photographic printer according to claim 1, wherein said two-dimensional display unit is one of a light-emitting two-dimensional display unit and a photo-detecting two-dimensional display unit.

6. A condition-setting method for a photographic printer according to claim 1, wherein said two-dimensional display unit is a liquid crystal panel.

7. A condition-setting method for a photographic printer according to claim 1, wherein the print-exposure operation at said digital exposure section is performed by compressing a plurality of frames of image.

8. A condition-setting method for a photographic printer according to claim 1, wherein said correction value is for print-exposing the image recorded on said developed photographic film to a light-sensitive material with a proper exposure amount.

9. A condition-setting method for a photographic printer according to claim 8, wherein said correction value is set on the basis of a density value obtained by measuring the print density at said surface exposure section.

10. A condition-setting method for a photographic printer according to claim 1, wherein said reference exposure conditions are based on a reference exposure time of a constant light quantity of the light source of said digital exposure section.

11. A photographic printer comprising:
  a surface exposure section for print-exposing an image recorded on a developed photographic film to a light-sensitive material, a digital exposure section for displaying digitally-processed image data on a two-dimensional display unit and print-exposing the displayed image to said light-sensitive material, said photographic printer further comprising:
    means for storing condition-setting image data having added thereto a correction value used for setting the exposure conditions at said surface exposure section; and
    means for setting reference exposure conditions for said digital exposure section on the basis of the condition-setting image data stored.

12. A photographic printer according to claim 11, wherein said setting means measures the density of the image print-exposed at said digital exposure section and sets reference exposure conditions by converging the density measurement to a reference density.

13. A photographic printer according to claim 12, wherein said setting means sets reference exposure conditions by converging print density for said surface exposure section and the print density for said digital exposure section to the same target value.

14. A photographic printer according to claim 11, wherein said two-dimensional display unit is one of a light-emitting two-dimensional display unit and a photo-detecting two-dimensional display unit.

15. A photographic printer according to claim 11, wherein said two-dimensional display unit is a liquid crystal panel.

16. A photographic printer according to claim 11, wherein said digital exposure section compresses a plurality of frames of images during the print-exposure operation.

17. A photographic printer according to claim 11, wherein said surface exposure section print-exposes the image recorded on said developed photographic film to said light-sensitive material with a proper exposure amount based on said correction value.

18. A photographic printer according to claim 17, wherein said surface exposure section sets said correction value based on the density measurement obtained by measuring the print density.

19. A photographic printer according to claim 11, wherein said reference exposure conditions are based on a reference exposure time of a constant light quantity of the light source of said digital exposure section.

20. A photographic printer comprising:
  a surface exposure section for print-exposing an image recorded on a developed photographic film to a light-sensitive material, a digital exposure section for displaying digitally-processed image data on a two-dimensional display unit and print-exposing the displayed image to said light-sensitive material, said photographic printer further comprising:
    means for storing condition setting image data having added thereto a correction values, generated in said surface exposing section, used for setting the exposure conditions for said surface exposure section; and
    means for setting reference exposure conditions for said digital exposure section on the basis of the condition-setting image data stored.

* * * * *